(12) United States Patent
Andrew et al.

(10) Patent No.: US 10,288,444 B2
(45) Date of Patent: May 14, 2019

(54) GENERATING INSTRUCTIONS FOR SHARED TRAVEL EXPERIENCES

(71) Applicant: Microsoft Technology Licensing, LLC, Redmond, WA (US)

(72) Inventors: Felix Gerard Torquil Ifor Andrew, Seattle, WA (US); Geoffrey T. Ebersol, Seattle, WA (US); Kshitij Sethi, Bellevue, WA (US); Isabelle Rice, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/402,943

(22) Filed: Jan. 10, 2017

(65) Prior Publication Data

US 2018/0195874 A1 Jul. 12, 2018

(51) Int. Cl.
| | |
|---|---|
| *G01C 21/00* | (2006.01) |
| *G01C 21/36* | (2006.01) |
| *G01C 21/28* | (2006.01) |
| *H04W 4/02* | (2018.01) |
| *H04W 76/14* | (2018.01) |
| *H04W 84/18* | (2009.01) |

(52) U.S. Cl.
CPC ......... *G01C 21/3679* (2013.01); *G01C 21/28* (2013.01); *H04W 4/023* (2013.01); *H04W 76/14* (2018.02); *H04W 84/18* (2013.01)

(58) Field of Classification Search
CPC ... G01C 21/3679; G01C 21/28; H04W 76/14; H04W 4/023; H04W 76/023; H04W 84/18

USPC .......................................... 701/400, 424, 465
See application file for complete search history.

(56) References Cited

U.S. PATENT DOCUMENTS

| 9,746,334 | B1* | 8/2017 | Mahajan | G01C 21/3438 |
|---|---|---|---|---|
| 2002/0168938 | A1* | 11/2002 | Chang | H04W 4/08 |
| | | | | 455/41.1 |
| 2003/0100326 | A1 | 5/2003 | Grube et al. | |
| 2003/0191584 | A1 | 10/2003 | Robinson et al. | |
| 2005/0222756 | A1* | 10/2005 | Davis | G01C 21/3484 |
| | | | | 701/466 |

(Continued)

OTHER PUBLICATIONS

"RoadCast App", https://itunes.apple.com/us/app/roadcast-app/id982448284?mt=8, Published on: Feb. 17, 2016, 3 pages.

(Continued)

*Primary Examiner* — Shardul D Patel
(74) *Attorney, Agent, or Firm* — Holzer Patel Drennan

(57) ABSTRACT

A first user of a smart phone or vehicle navigation system may invite a second user of a smart phone or vehicle navigation system to participate in a shared travel experience where the second user follows the first user. While on the shared trip, the first user is provided the location of the second user along with a route to a selected destination. The second user is provided the location of the first user, along with the route to the selected destination. The first user is able to identify points of interest on the route, which are then presented to the second user. A network is established that allows the first and second user to have a two-way conversation, and to synchronize the music that is listened to by the first user and the second user to simulate the experience of being together in the same vehicle.

20 Claims, 11 Drawing Sheets

(56) References Cited

U.S. PATENT DOCUMENTS

| | | | |
|---|---|---|---|
| 2008/0167937 A1* | 7/2008 | Coughlin | G01C 21/20 705/7.16 |
| 2009/0005018 A1 | 1/2009 | Forstall et al. | |
| 2009/0017803 A1* | 1/2009 | Brillhart | G01C 21/20 455/414.2 |
| 2009/0276154 A1 | 11/2009 | Subramanian et al. | |
| 2010/0057346 A1* | 3/2010 | Ehrlacher | G01C 21/3461 701/533 |
| 2011/0118975 A1* | 5/2011 | Chen | G01C 21/3438 701/533 |
| 2013/0218445 A1* | 8/2013 | Basir | G08G 1/00 701/117 |
| 2014/0005941 A1 | 1/2014 | Paek et al. | |
| 2014/0074392 A1* | 3/2014 | Holm | G01C 21/3415 701/400 |
| 2014/0129143 A1 | 5/2014 | Dave et al. | |
| 2014/0278053 A1 | 9/2014 | Wu et al. | |
| 2014/0343841 A1* | 11/2014 | Faaborg | G01C 21/3438 701/465 |
| 2015/0179000 A1* | 6/2015 | Jayanthi | G01C 21/26 701/32.4 |
| 2015/0268057 A1* | 9/2015 | Tuukkanen | G01C 21/3661 701/516 |
| 2016/0191637 A1 | 6/2016 | Memon | |
| 2016/0314687 A1* | 10/2016 | Koshizen | G08G 1/0133 |

OTHER PUBLICATIONS

Vranizan, Annie, "Discover a New Route, Follow It from Your Phone", http://blog.strava.com/discover-a-new-route-follow-it-from-your-phone-7749/, Published on: May 28, 2014, 13 pages.

Barker, Philip, "Sync, share and plan routes with Collections on HERE for Android", http://360.here.com/2014/12/17/sync-share-plan-routes-collections-android/, Published on: Dec. 17, 2014, 7 pages.

* cited by examiner

GENERATING INSTRUCTIONS FOR SHARED TRAVEL EXPERIENCES

BACKGROUND

Traveling with friends or family in a vehicle can be a fun shared experience. While in the vehicle, the passengers may converse, listen to music, and point out interesting sites or other points of interest that they notice on the way.

While such trips are fun, there are drawbacks associated with traveling in a vehicle. First, if there are too many participants to fit in a single vehicle, it may be necessary to use multiple vehicles. Often, participants relegated to a secondary vehicle miss out on the conversation and other activities that take place in the first vehicle. Further, the participants in the secondary vehicle may be forced to blindly follow the primary vehicle without clearly understanding the route chosen by the driver of the primary vehicle.

Additionally, if a participant misses the trip, or wishes to recreate the trip, there is no way for the participant to recreate or reenact the experiences had while on the trip. For example, there is no way to reexperience the trip including traveling the particular route taken on the original trip, visiting the same locations at approximately the same times, and experiencing the same media (i.e., music) that was experienced on the trip at approximately the same times.

SUMMARY

A first user of a smart phone or a vehicle navigation system may invite a second user of a smart phone or a vehicle navigation system to participate in a shared travel experience where the second user follows the first user. While on the shared trip, the first user is provided the location of the second user along with a route to a selected destination. The second user is provided the location of the first user, along with the route to the selected destination. The first user is able to identify points of interest on the route, which are presented to the second user. A network between the first user and the second user is established that allows the first user and the second user to have a two-way conversation, and to synchronize the music that is listened to by the first user and the second user to simulate the experience of being together in the same vehicle. After the trip is completed, the route and the locations visited on the trip can be recorded, along with the media consumed (e.g., music listened to) or generated (e.g., pictures taken) on the trip, to allow for the users, or other users, to recreate the trip.

In an implementation, a system for creating a shared travel experience for a first user and a second user is provided. The system includes at least one computing device and a trip engine. The trip engine may be adapted to: receive a request for the second user to follow the first user, wherein the request comprises a first route associated with the first user and a current location of the first user, and wherein the first route comprises a destination location; provide instructions for the second user to follow the first user to the destination location using the first route; receive an updated current location of the first user; determine that a difference between a current location of the second user and the updated current location of the first user exceeds a threshold; in response to the determination, determine a second route to the destination location from the current location of the second user; and provide instructions for the second user to travel to the destination location using the second route.

In an implementation, a system for creating a shared travel experience for a first vehicle and a second vehicle is provided. The system may include at least one computing device and a trip engine. The trip engine may be adapted to: receive a request for the second vehicle to follow the first vehicle, wherein the request comprises a first route associated with the first vehicle and a current location of the first vehicle, and wherein the first route comprises a destination location; provide instructions for the second vehicle to follow the first vehicle to the destination location using the first route; establish an ad-hoc network between the first vehicle and the second vehicle; facilitate two-way voice communication between the first vehicle and the second vehicle via the ad hoc network; and facilitate the synchronized playing of media content in the first vehicle and the second vehicle via the ad hoc network.

In an implementation, a method for creating a shared travel experience for a first user and a second user is provided. The method includes: receiving a request for the second user to follow the first user by a computing device, wherein the request comprises a first route associated with the first user, and wherein the first route comprises a destination location; receiving a current location of the first user and a current location of the second user by the computing device; based on the first route and the current locations, determining a second route for the second user by the computing device, wherein the second route comprises the destination location and is different than the first route; based on the current locations, the first route, and the second route, determining a time for the second user to begin traveling on the second route by the computing device; and providing instructions for the second user to follow the first user to the destination location using the second route at the determined time by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
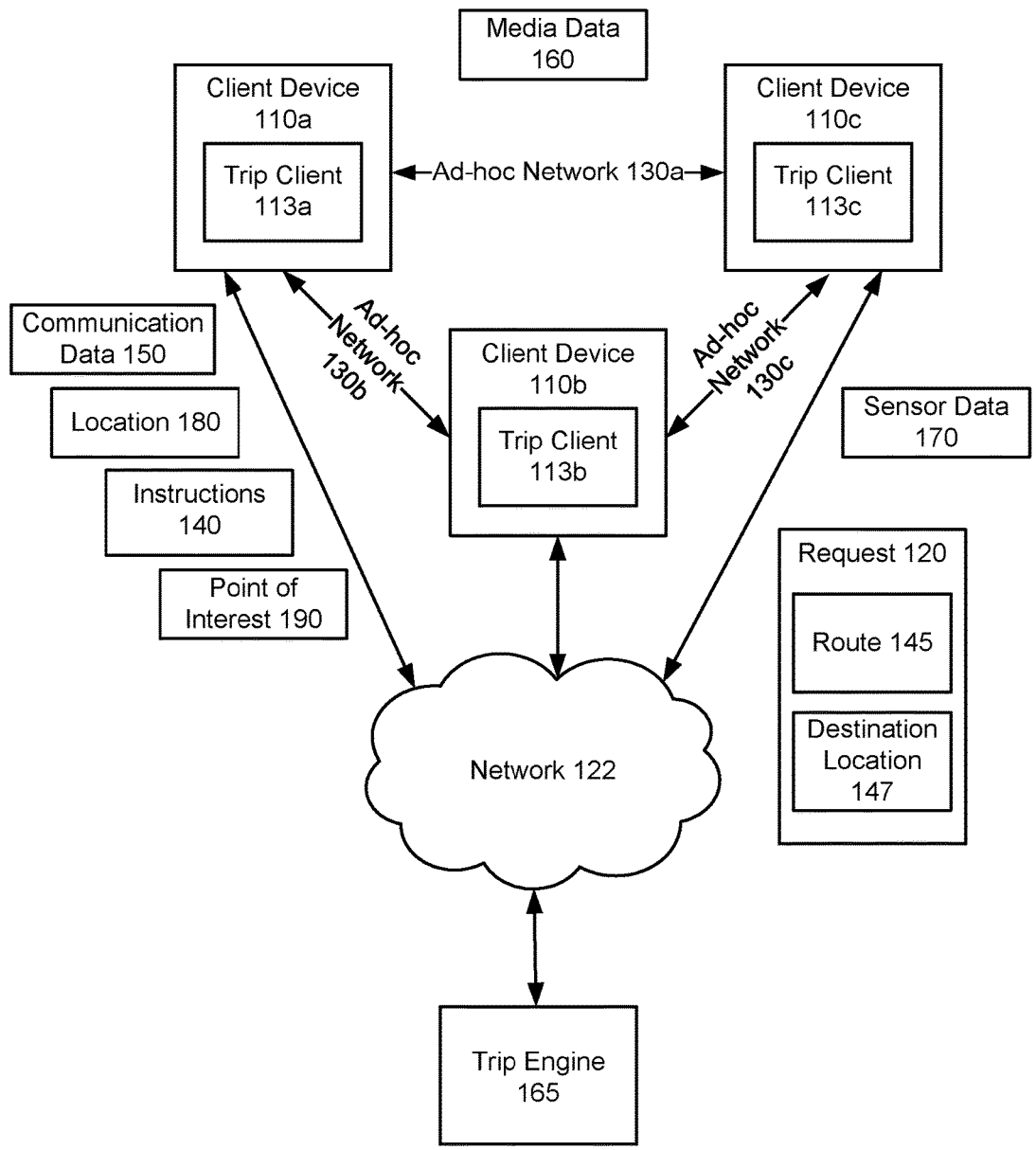
FIG. 1 is an illustration of an exemplary environment for creating shared travel experiences for users.

FIG. 1 is an illustration of an exemplary environment 100 for creating shared travel experiences for users. The environment 100 may include a trip engine 165 and one or more client devices 110 (i.e., client devices 110a, 110b, and 110c) in communication through a network 122. The network 122 may be a variety of network types including the public switched telephone network (PSTN), a cellular telephone network, and a packet switched network (e.g., the Internet). Although only three client devices 110 and one trip engine 165 are shown in FIG. 1, there is no limit to the number of client devices 110 and trip engines 165 that may be supported.

Figure 11:
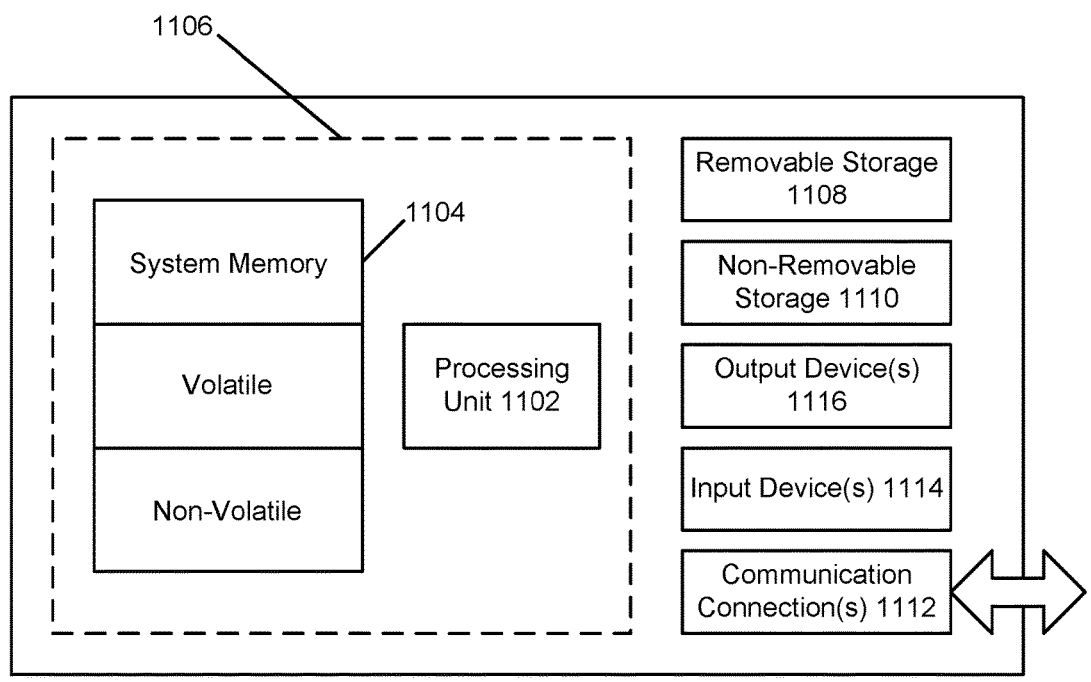
FIG. 11 shows an exemplary computing environment in which example embodiments and aspects may be implemented.

The client devices 110 and the trip engine 165 may be implemented using a variety of computing devices such as smart phones, desktop computers, laptop computers, tablets, vehicle navigation systems, and video game consoles. Other types of computing devices may be supported. A suitable computing device is illustrated in FIG. 11 as the computing device 1100.

Each client device 110 may further include a trip client 113 (i.e., trip clients 113a, 113b, and 113c). The trip client 113 may be used by a user of the client device 110 to create or participate in a shared travel experience. As used herein, a shared travel experience is a trip where at least two users of two client devices 110 are able to participate in the trip and at least one aspect of the trip is synchronized between the two clients devices 110, even though the users may not be physically in a same vehicle or at a same location. The aspect may include the route that is followed, and the music that is listened to, for example.

One example of such a shared travel experience is known as "follow the leader" in which a user of the client device 110a may invite the users of the client devices 110b and 110c to "follow them" on a trip. After the user of the client device 110a begins the trip, the users of the client devices 110b and 110c may receive instructions to follow the user of the client device 110a including a route that has been selected by the user of the client device 110a. During the trip, the user of the client device 110a may be able to communicate (using voice or text) with the users of the client devices 110b and 110c, and music or other media that is being used by the user of the client device 110a may be synchronized with the users of the client devices 110b and 110c.

As may be appreciated, by providing instructions to follow the user of the client 110a, allowing communication amongst the users of the client devices 110, and synchronizing media amongst the users of the client devices 110, a shared travel experience is provided. Because the users are able to communicate, experience the same media, and are traveling on the same route, the users have a travel experience that is similar to the experience that the users would have if they were all traveling in a same vehicle.

Depending on the implementation, each client device 110 may be associated with a mode of transportation such as walking, driving, boating, biking, driving, or flying. Other modes of transportation may be supported. For example, the client device 110a may be a smart phone currently held by a user in a first vehicle, or the client device 110b may be vehicle navigation system integrated into a second vehicle.

When a user desires to initiate a shared travel experience with one or more other users, the user may use the trip client 113 to generate a request 120. Depending in the implementation, the request 120 may indicate a destination location 147 that the user would like to travel to. The request may also indicate a route 145 that the user intends to travel to reach the destination location 147.

The user may select the other users that the user would like to participate in the travel experience, and the request 120 may be sent to the selected users by one or both of the route client 113 or the trip engine 165. The users may accept or reject the request 120. For example, a user may select users for a trip from their contacts or associated social networking applications.

In some implementations, the request 120 may further indicate which of the users will be the "leader" and which users will be the "followers." Alternatively, the users may vote on who will become the leader. As described further below, the leader may be in control of some or all of the route 145 that is used for the trip and other aspects of the trip.

After one or more users accept the request 120 and the trip begins, the trip client 113 and/or the trip engine 165 may provide instructions 140 to each of the users that accepted the request 120. The instructions 140 received by a user may be directions to travel to the destination location 147 from a location 180 associated with the user. The instructions 140 may be based on the current location 180 of the user, the current location 180 of the leader, and the route 145 that the user has traveled on the trip so far. The locations 180 of the users may be determined using a GPS or other location determination component associated with the client devices 110.

For example, a user of the client device 110a may be the leader of a trip, and a user of the client device 110b may be a follower of the trip. After the trip begins and the client device 110a has started traveling, the trip client 113a and/or the trip engine 165 may send the trip client 113b of the client device 110b instructions 140 to travel a route 145 to the destination location 147. In order to enable the shared travel experience, the route 145 may be a route that takes the user of the client device 110b to the location 180 where the leader started the trip and that follows the leader on the same route 145 that is currently being used by the leader. Such a scenario may be useful for a tour or guided sightseeing where the follower wants to travel the exact route 145 selected by the leader.

Alternatively or additionally, the instructions 140 may further include a time when the user may start to follow the route 145. As may be appreciated, a location 180 of the user of the client 110b may be far from where the leader began the shared trip, but may be close to some intermediate location 180 that is on the way of the trip. Accordingly, rather than have the user travel to the start location 180, the trip client 113b and/or the trip engine 165 may instruct the user to wait until an indicated time, and then travel to the intermediate location 180.

For example, a trip may use a particular highway that passes by an exit that is close to where the user of the client device 110b resides. Rather than instruct the user to travel to the location 180 where the leader starts the trip, the trip client 113b and/or trip engine 165 may calculate when the leader is likely to pass the exit, and may generate instructions 140 for the user of the client device 110b to begin the trip at the calculated time. Such a scenario may be useful for a commute where the follower and the leader are traveling to a common destination location 147, but do not need to follow the same route 145.

To further facilitate the travel experience, the trip clients 113 and/or trip engine 165 may allow communication data 150 to be exchanged between the client devices 110 during the trip. The communication data 150 may include text data and voice data. Depending on the implementation, the trip clients 113 and/or trip engine 165 may allow the users to provide voice or text input into their respective client devices 110, and may provide the voice or text input to each of the other client devices 110 associated with the trip.

For example, each of the client devices 110a-c may be implemented by a vehicle navigation system. When a user of the client device 110a speaks in their associated vehicle, a microphone or other voice input device of the client device 110a may capture the speech as the communication data 150 and the trip client 113a and/or the trip engine 165 may distribute the communication data 150 to the client devices 110b and 110c that are also participating in the trip. The speech associated with the communication data 150 may be played by a speaker or other output device in the vehicles associated with the client devices 110b and 110c.

To further facilitate the travel experience, the trip clients 113 and/or trip engine 165 may also allow media data 160 to be exchanged between the client devices 110. The media data 160 may include any media that a user is using or consuming on their respective client devices 110a and may include audio data or video data.

Continuing the example above, each of the client devices 110a-c may be implemented by a vehicle navigation system. When a user of the client device 110a selects music to play in their vehicle, media data 160 that identifies the particular song may be provided by the trip client 113a and/or trip engine 165 to each of the client devices 110b and 110c. The media data 160 may identify the song that is playing and an offset that represents the current time or position of the song. Each of the client devices 110b and 110c may synchronize their audio systems to the particular song and offset such that the music in each of the vehicles is synchronized.

To further facilitate the travel experience, the trip clients 113 and/or trip engine 165 may allow points of interest 190 to be exchanged between the client devices 110. Points of interest 190 may include objects, places, and things that are passed by the users on the trip. Depending on the implementation, each point of interest 190 may include a location or coordinates of the point of interest 190 and text that describes the point of interest 190.

For example, the leader associated with the client device 110 while on the trip may pass a scenic view. Accordingly, the leader may identify the scenic view as a point of interest 190 on a map using the trip client 113a and provide text such as "Look at that view!" The point of interest 190 may be provided by the user using a touch interface or using voice recognition. The generated point of interest 190 may be provided to each of the users at the client devices 110b and 110c by the trip client 110a and/or trip engine 165. When the users of the client devices 110b and 110c are close to the point of interest 190, the point of interest 190 may be displayed to the users on the client devices 110a and 110b by the trip clients 113a and 113b along with the associated text.

To further facilitate the travel experience, the trip clients 113 and/or trip engine 165 may allow sensor data 170 to be exchanged between the client devices 110. Sensor data 170 may include data collected by various sensors of the client device 110 that may be useful for other participants in the trip. For example, the sensor data 170 may include a speed or velocity of the client device 110, how much fuel or battery the client device 110 has remaining, weather conditions associated with the client device 110 (is it raining, what is the temperature, etc.). Other information may be collected.

To further facilitate the travel experience, the client devices 110a-c may establish one of more ad-hoc networks 130 (i.e., ad-hoc networks 130a, b, and c). An ad-hoc network 130 may be a decentralized network that may allow each of the trip clients 113 and/or client devices 110 to communicate directly with one another, rather than communicate indirectly through the network 122. One advantage of the ad-hoc network 130 is that because the distances between the associated client devices 110 in the ad-hoc network 120 is small, the resulting communications between the client devices 110 using the ad-hoc network 130 is typically faster than communications made using the network 122. Moreover, because the client devices 110 create the ad-hoc networks 130 themselves, they are less susceptible to interference and/or outages that may be associated with the network 122. For example, the network 122 may be unavailable when the client device 110 is in an area with no cell phone coverage, or is in a tunnel.

A drawback associated with ad-hoc networks 130 is that they may use a relatively small distance between the client devices 110 to function properly. Accordingly, the trip clients 113 and/or the trip engine 165 may use the locations 180 of the client devices 110 to determine if the client devices 110 are close enough to use the ad-hoc network 130 to communicate, and if so, communicate (e.g., exchange communication data 150, media data 170, sensor data 170 etc.) using the ad-hoc network 130. Otherwise, the client devices 110 may communicate using the network 122.

Figure 2:
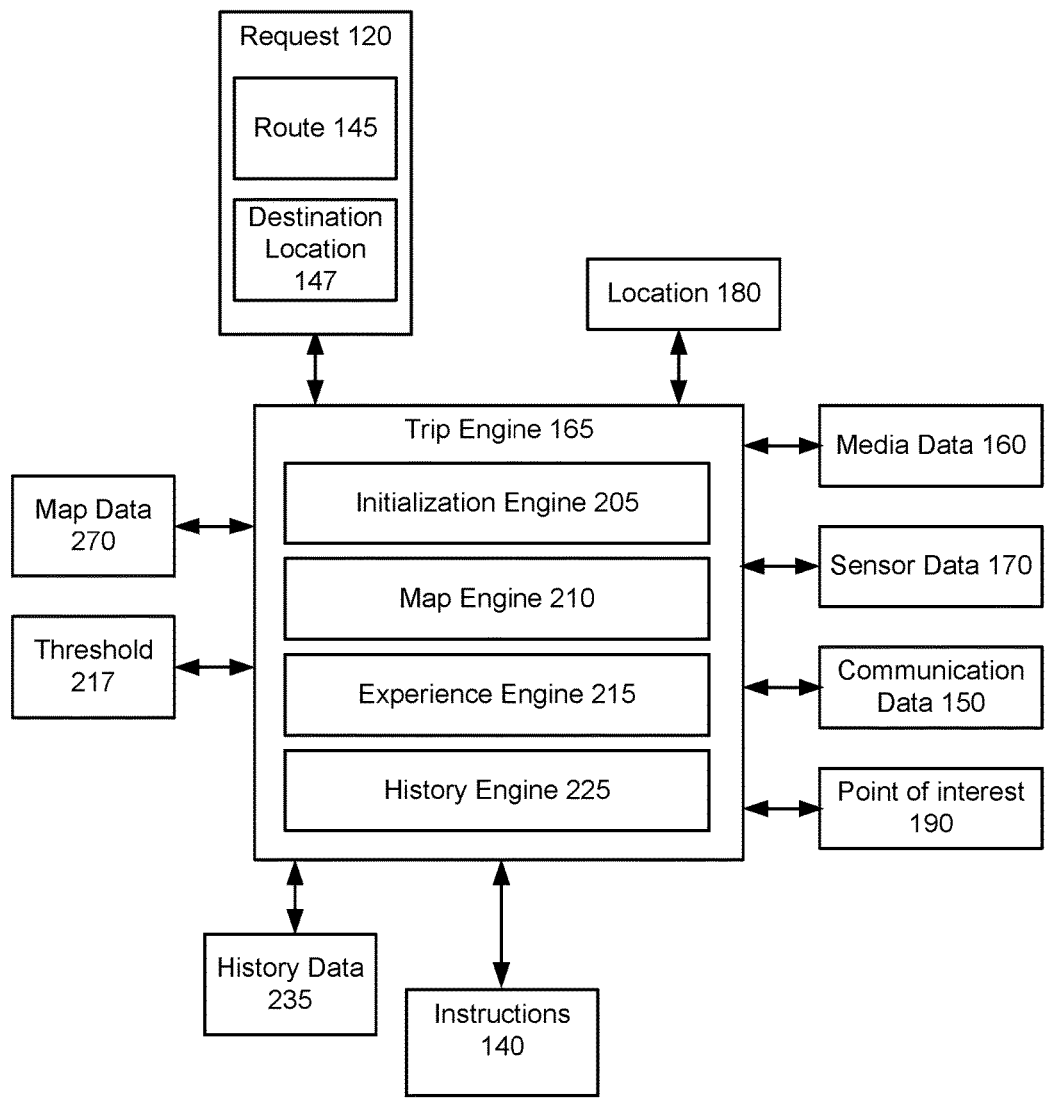
FIG. 2 is an illustration of an implementation of an exemplary trip engine.

FIG. 2 is an illustration of an implementation of an exemplary trip engine 165. The trip engine 165 may include one or more components including an initialization engine 205, a map engine 210, an experience engine 215, and a history engine 225. More or fewer components may be included in the trip engine 165. Some or all of the components of the trip engine 165 may be implemented by one or more computing devices such as the computing device 1100 described with respect to FIG. 11. In addition, some or all of the functionality attributed to the trip engine 165 may be performed by the trip clients 113, and vice versa.

The initialization engine 205 may allow a user to create a shared travel experience. In some implementations, the user may create a shared travel experience by creating a request 120. The request 120 may be an invitation for other users to join the user in the shared travel experience. The request 120 may typically include at least a destination location 147 of where the user is traveling to. The request 120 may include the current location 180 of the user and a route 145 that the user intends to take from the current location 180 to the destination location 147. In addition, the request 120 may include a time and/or date of when the user plans to take the trip.

Depending on the implementation, the route 145 may be specified by the user. For example, the user may "draw" or otherwise define a desired route 145 using the initialization engine 205. Alternatively, the initialization engine 205 may use the current location 180 of the user and the destination location 147 to recommend one or more possible routes 145, or to recommend an optimal route 145. The user may select the desired route from the selections. Alternatively, the route 145 may be left unspecified and may be determined based on the actual path traveled by the user. The routes 145 may be determined and/or recommended by the initialization engine 205 using map data 270, for example.

The request 120 may further identify the type or mode of transportation that can be used for the trip. The modes of transportation may include driving, bicycling, walking, running, and public transportation. Other modes of transportation may be supported. The mode of transportation may be selected by the user or leader of the trip.

The request 120 may be for a single trip, or may be for a trip with multiple occurrences. For example, a user may generate a request 120 that corresponds to a commute that occurs every weekday.

In some implementations, the request 120 may identify one or more other users for the shared travel experience. The initialization engine 205 may provide the user with a list of users who may participate in a trip. The list of users may be taken from the user's contacts, and social networking applications associated with the user, for example. In other implementations, the request 120 may not identify any particular user or users but may be open to any user who is interested in participating.

The request 120 may further identify one or more leaders. The leader of the trip may be the user whose location 180 and/or route 145 is used to generate routes 145 for some or all of the other participants on the trip. The leader may also be in control of other aspects of the travel experience such as the points of interest 190 that are indicated, and the media data 160 that is communicated (i.e., what music is played). The leader may be specified by the creator of the request 120, or may be selected by one or more participants of the trip. Depending on the implementation, the leader may be static, or may be dynamic. For example, the leader may change based on which participant is closest to the destination location 147, or may change based on the selection or a vote of the followers and/or the current leader.

The generated requests 120 may be provided to each of the indicated users by the initialization engine 205. A user may either accept or reject the request 120. If the user accepts the request, the initialization engine 205 may send the user the destination location 147, the associated route 145, and an indication of when the trip will begin.

For example, a user may wish to invite his family on a drive to follow with him from San Francisco to Los Angeles on Apr. 4, 2016 on a route 145 that travels along the Pacific Ocean. Accordingly, the user may use the initialization engine 205 to select users that are family members, to select the desired route 145, and to select the desired date. The initialization engine 205 may generate a request 120 with the provided information and may send the generated request 120 to client devices 110 associated with the selected family members. On the day of the trip, the initialization engine 205 may provide the users that accepted the request 120 with the current location 180 of the user along with instructions 140 to follow the user on the trip.

As another example, a user may be at a convention. The user may know that other colleagues are likely to be at the same location and could meet her for lunch. Accordingly, the user may send a request 120 to her contacts that includes the current location 180 of the user, a destination location 147 that corresponds to a selected restaurant, and a time when the user expects to arrive. As the time of the scheduled lunch approaches, the initialization engine 205 may provide the users that accepted the request 120 with the current location 180 of the user along with instructions 140 to follow the user to the restaurant.

The map engine 210 may determine routes 145 and provide instructions 140 based on the locations 180 of the users. Where the user is a leader, the map engine 210 may provide a route 145 for the user based on the map data 270, the destination location 147, and the current location 180 of the user. For example, the map engine 210 may use the map data 270 to determine an optimal route 145 (e.g., based on distance, time, and/or other factors) between the current location 180 of the user and the destination location 147. The optimal route 145 may be presented to the user on a display associated with their client device 110. Where the user selected or created their own route 145, the selected route 145 may be presented on the display.

Where the user is a follower, the map engine 210 may provide a route 145 for the user based on the map data 270, the destination location 147, the location 180 of the user, the location 180 of the leader, and the route 145 traveled by the leader so far. In implementations where the followers follow the exact route 145 traveled by the leader, the map engine 210 may determine the route 145 for a follower by determining a route 145 based on the map data 270 that starts at the current location 180 of the follower, passes though the route 145 traveled by the leader so far, and continues to the current location 180 of the leader. The map engine 210 may update the route 145 as the leader continues the trip.

Depending on the implementation, if a follower falls to far behind the leader, the map engine 210 may recommend an alternative route 145 to the follower. The alternative route may not strictly follow the same route 145 traveled by the leader, but is instead meant to ensure that the follower does not fall too far behind the leader. In some implementations, the map engine 210 may recommend the alternative route 145 when the difference between the location 180 of the leader and the location 180 of the follower exceeds a threshold 217. The threshold 217 may be a distance (e.g., one mile, five miles, or ten miles, etc.). Alternatively, the threshold 217 may be a time (e.g., five minutes, ten minutes, or one hour, etc.). The threshold 217 may be set by the leader or by the user that created the initial request 120, for example.

In some implementations, rather than have the followers take the exact route 145 taken by the leader, the leader may desire that the followers meet up with the leader so that the users can travel to the destination location 147 together. For example, for a trip such as a commute, the leader may desire that the users travel together in a pack. Accordingly, in such implementations, the map engine 210 may determine a route 145 for a follower using the map data 170 the location 180 of the leader, and the location 180 of the follower. The map engine 210 may determine a route 145 that will allow the follower to intercept or arrive at an intermediate location on the route 145 that the leader is currently following. Other information such as the current speeds of the follower and the leader may be considered by the map engine 210 when making the calculation. The speeds of the follower and the leader may be determined by the map engine 210 based on the sensor data 170, for example.

The map engine 210, in addition to routes 145, may further calculate when a user should begin a trip as part of the instructions 140. As described above, because of a location 180 associated with a follower, the follower may not have to begin a trip until after the leader has passed some intermediate location, or the location 180 associated with the follower. The map engine 210 may determine the start time for a follower based on the map data 270, the current speed and location 180 of the leader, and the current speed and location 180 of the follower. Other data such as historical or real-time traffic data may also be considered by the map engine 210.

The experience engine 215 may facilitate the creation of a shared travel experience for the users on a trip. In some implementations, the experience engine 215 may provide the shared travel experience by ensuring that all of the users of the trip can see the location 180 of some or all of the users on the trip. For example, the experience engine 215 may cause a user interface to be displayed on the client device 110 that displays the location 180 of the user, and the locations 180 of the other users associated with the trip. Each user may be displayed using a different icon, color, or other descriptive information that can be used to identify the users. The locations 180 of the users may be displayed along with the current route 145 being traveled by the leader. Where different users are associated with different routes 145, the various routes 145 may be displayed along with descriptive information about each route 145.

In some implementations, the experience engine 215 may allow a user (such as the leader) to generate a route 145, and may provide the generated routes 145 to the users in the shared travel experience. For example, the leader may use their trip client 113 to "draw" a line on a map that corresponds to a desired route 145. For example, the leader may use a touch interface associated with the client device 110 to create a line using their finger or stylus. The experience engine 215 and/or the map engine 210 may generate a route 145 that best approximates the line using the map data 270, and may provide the generated route 145 to the users associated with the shared travel experience. The generated route 145 may then be used for the shared travel experience.

In some implementations, the experience engine 215 may provide the shared travel experience by establishing one or more ad-hoc networks 130. As described previously, the ad-hoc network 130 may be established by the client devices 110, and may allow the client devices 110 to communicate directly with each other rather than through a shared network 122 such as the Internet. The experience engine 215 may create the ad-hoc networks 130 using a variety of wireless technologies including Wifi and Bluetooth, for example. Other methods for creating wireless networks may be supported.

The experience engine 215 may use the ad-hoc network 130 to transmit data between the client devices 110 when the client devices 110 are within range of each other. As described above, one drawback associated with ad-hoc networks 130 may be the limited range. Accordingly, the experience engine 215 may determine if the client devices 110 are within range of one another before using the ad-hoc networks 130 to transmit data. If the client devices 110 are not within range, then the experience engine 215 may transmit data using the network 122.

One type of data that is transmitted by the experience engine 215 is communication data 150. The communication data 150 may include voice data (e.g., speech) and text data (e.g., text messages). In particular, the experience engine 215 may transmit communication data 150 to facilitate two way communication between the various client devices 110 associated with the shared travel experience.

For example, the experience engine 215 may use microphones or other sensors associated with a client device 110 to record speech, and other sound, that occurs in proximity of the client device 110. The recorded speech may be provided to the other client devices 110 as part of the communication data 150. The recorded speech may be output or played by the other client devices 110 using speakers or other output devices associated with the client devices 110. This process may occur at each of the client devices 110 associated with the shared travel experience, which may help create the impression that all of the users of the client devices 110 are traveling in proximity of each other.

Depending on the implementation, which client devices 110 send and/or receive the communication data 150 may be controlled by the leader. For example, the leader may specify that only the leader, or some selected subset of the client devices 110 may transmit communication data 150 to each of the other client devices 110. Controlling the number of client devices 110 that may transmit communication data 150 may be beneficial where there are a large number of client devices 110 participating in the shared travel experience, or in scenarios where the leader is expected to do most of the speaking (e.g., tours).

Another type of data that may be transmitted by the experience engine 215 is media data 160. The media data 160 may include audio data (e.g., music) and video data (e.g., movies, videos, and television shows). In particular, the media data 160 may identify (or include) a particular content item (e.g., song or video) that is being listed to or viewed at a particular client device 110. Each client device 110 may receive the media data 160, and may play or screen the identified or provided content item. The media data 160 may further include an offset, or other synchronization information, so that the playing or screening of the content items can be synchronized across the client devices 110.

Depending on the implementation, the experience engine 215 may transmit media data 160 from the client device 110 associated with the leader of the shared travel experience to each of the client devices 110 associated with followers of the shared travel experience. Thus, the leader may control the content items that are played during the shared travel experience. In other implementations, the users may take turns providing the media data 160, or may vote on who may provide the media data 160.

Another type of data that may be transmitted by the experience engine 215 is sensor data 170. The sensor data 170 may include data generated by one or more sensors associated with each client device 110. Where the client device 110 is a smart phone or tablet computer, the sensor data 170 may include data such as temperature, altitude, barometric pressure, speed, and acceleration. Where the client device 110 is a vehicle navigation system, the sensor data 170 may include data such as the external temperature of the vehicle, the speed of the vehicle, and the remaining fuel of the vehicle. Other types of sensor data 170 may be supported.

Depending on the implementation, some or all of the sensor data 170 may be provided to each of the client devices 110 participating in the shared travel experience, or may be provided only to the client device 110 associated with the leader. The sensor data 170 may be used by the experience engine 215 for a variety of purposes. For example, if the sensor data 170 of a particular client device 110 indicates that the speed of the client device 110 is zero, or has been low for a long period of time, the experience engine 215 may determine that the client device 110 is experiencing traffic conditions, and some or all of the other client devices 110 may be rerouted to avoid the traffic. In another example, the leader may determine from the sensor data 170 that one or more followers are low on fuel, and that the leader should reroute the trip to a gas station.

The experience engine 215 may further allow the client devices 110 to exchange indicators of points of interest 190. A point of interest 190 may be a place, building, or any type of thing that is associated with a location. The point of interest 190 may further be associated with text that describes the point of interest 190.

A user may create a point of interest 190 using the trip client 113 of their associated client device 110. For example, a user may select an icon or other user interface element displayed by their client device 110 that allows them to create a point of interest 190. The user may indicate where on a displayed map that the point of interest 190 is located. In addition, the user may speak or enter descriptive information for the point of interest 190. The spoken or entered descriptive information may be associated with the point of interest 190 by the trip client 113 of the associated client device 110. The trip client 113 may provide an indicator of the point of interest 190 to the experience engine 215.

The experience engine 215 may provide the indicated point of interest 190, and associated descriptive information, to each of the client devices 110 associated with the shared travel experience. The indication of the point of interest 190 may be displayed to the users on the displays of their associated client devices 110.

The experience engine 215 may further allow a leader to designate one or more followers as "co-pilots." A co-pilot may be a user that is able to control some aspects of the group trip experience such as the media data 160, communication data 150, and points of interest 190.

For example, a leader driving a vehicle on a trip may be associated with a client device 110 such as a smart phone. Rather than attempt to control aspects of the trip while driving, the leader may use the experience engine 215 to designate a passenger in the vehicle as a co-pilot. For example, the co-pilot may adjust the music that is played on the trip, and may indicate points of interest 190 as if they were the leader.

The experience engine 215 may further allow one of more of the followers to become the leader of the trip. The experience engine 215 may allow a follower to request that they become the leader. Depending on the implementation, when a follower requests to become the leader, the follower may automatically become the leader. In another implementation, when a follower requests to become the leader, the current leader may be asked to approve the transfer of leadership, and if the current leader approves, the follower may become the leader. In another implementation, when a follower requests to become the leader, the other followers may be asked to "vote" or approve the transfer of leadership, if some percentage of the followers approve, then the requesting follower may become the leader.

For example, during a shared travel experience, followers and the leader may stop their associated vehicles at a rest stop. One of the followers may desire to become the leader for the rest of the trip. The follower may then provide a message or other indication that the follower desires to become the leader to the experience engine 215. The experience engine 215 may then make the follower the leader, and the previous leader may become a follower. The trip may resume when the new leader leaves the rest stop.

The history engine 225 may save routes 145 and other information associated with a shared travel experience. The other information may include the communication data 150, media data 160, and sensor data 170 generated and shared during the trip. The history engine 225 may save the shared travel experiences including routes 145 and other information in history data 235. Other information such as photographs taken by the participants of the shared travel experience may further stored by the history engine 225. The photographs may be identified based on time stamps and location information that may be associated with photographs taken by client devices 110 such as smart phones The history engine 225 may allow users to browse, select, and share the stored shared travel experiences. A user may select a particular experience from the history data 235 using the history engine 225, and may load the experience to their trip client 113 on their client device 110. The user may be provided instructions 140 to follow the routes 145 associated with the shared travel experience and may be presented with some or all of the communication data 150, media data 160, points of interest 190, and sensor data 170 that was provided during the shared travel experience.

For example, a user may select a shared travel experience of a guided trip of New York using their trip client 113. The user may be presented with the route 145 that the leader used during the guided trip. As the user travels the route 145, they may be presented with the music that was played during the trip (i.e., the media data 160), the voice communication that was received from the leader (i.e., the communication data 150), and the points of interest 190 that were indicated by the leader during the trip. The information and other data may be presented at approximately the same times and locations that they were presented in the original trip. In this way, users are able to share their travel experiences with other users, experience the travel experiences of other users, and reexperience their own travel experiences. In addition, the user may be presented with photographs taken by participants on the trip at approximately the same times and locations as when the photographs were originally taken.

Figure 3:
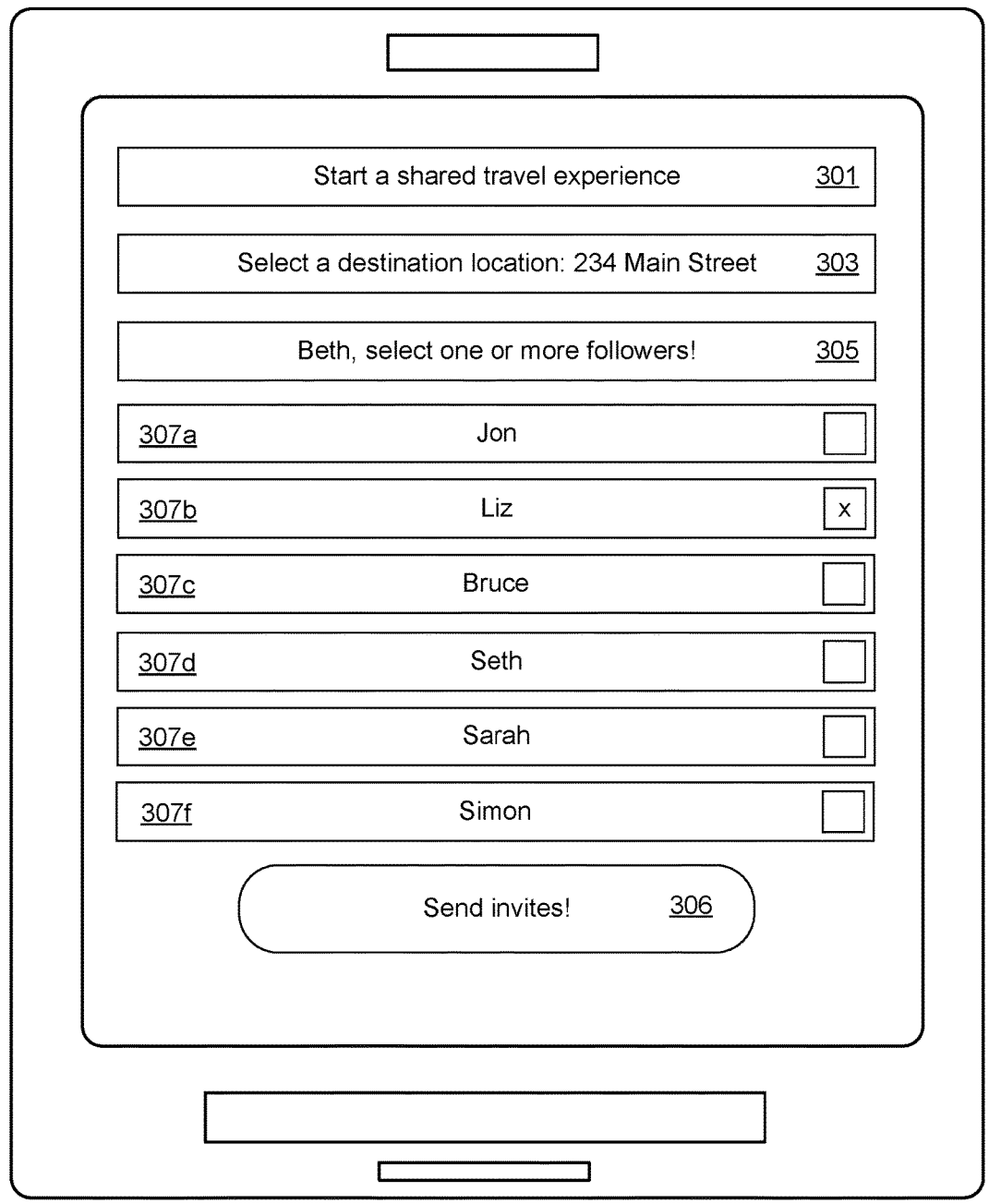
FIGS. 3-7 are illustrations of an example user interfaces for managing shared travel experiences.

FIG. 3 is an illustration of an example user interface 300 for managing a shared travel experience. The user interface 300 may be implemented by a trip client 113 executing on a client device 110. As shown, the user interface 300 is displayed on a tablet computing device. However, the user interface 300 may also be displayed by other computing devices such as smart phones and vehicle navigation systems.

As shown in a text box 301, the user associated with the user interface 300 may use the user interface 300 to "Start a shared travel experience." In the example shown, the user is named "Beth", and is creating a shared travel experience where Beth is the leader. Beth has entered the address "234 Main Street" into a text box 303 indicating that the destination location 147 of the trip is "234 Main Street."

The user interface 300 includes a text box 305 that instructs Beth to " . . . select one or more followers." To facilitate the selection, the user interface 300 has presented Beth with multiple names of users that may be selected. These names are illustrated in selection boxes 307 (i.e. selection boxes 370a, 370b, 370c, 370d, 370e, and 370f). Depending on the implementation, these names may have been taken from one or more contacts associated with Beth by either the trip client 113 or the trip engine 165.

Each selection box 307 includes a square that the user can select to include the corresponding user in the shared travel experience. In the example shown, Beth has selected the selection box 307b corresponding to the user "Liz". After Beth has finished adding users to the shared travel experience, Beth may select the user interface element 306 labeled "Send Invites!". In response, the initialization engine 205 may send a request 120 to the client device 110 associated with Liz.

Figure 4:
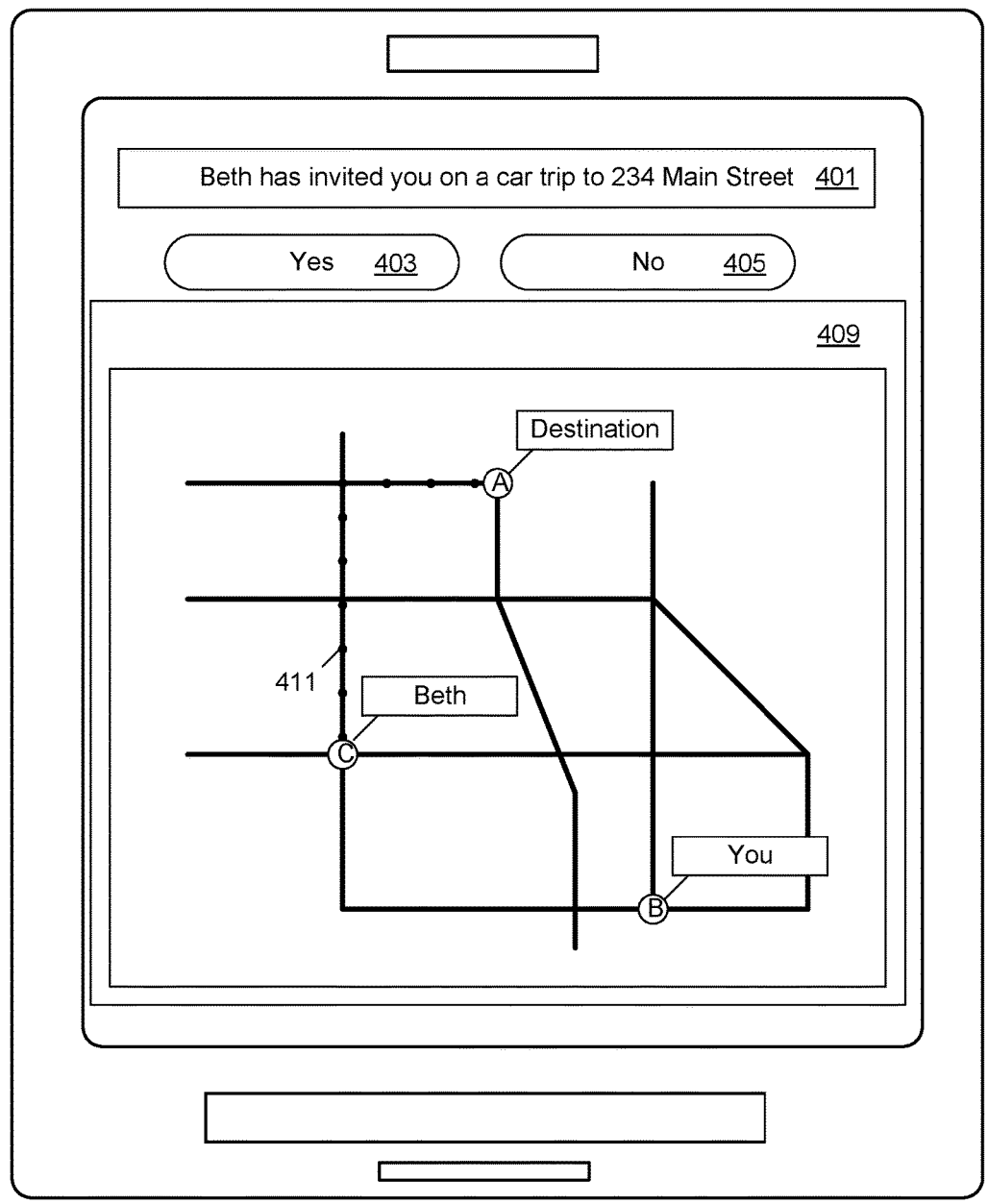

Continuing to FIG. 4, an example user interface 400 is shown that is displayed on the client device 110 associated with Liz. The user interface 400 includes a text box 401 that indicates that "Beth has invited you on a car trip to 234 Main Street." Liz may then accept or reject the request 120 using the user interface elements 403 and 405 labeled "Yes" and "No", respectively.

Also shown in the user interface 400 is a map 409 that provides additional information about the request 120. The map 409 shows the destination location 147 associated with the request 120 by the label A with the text "Destination." The proposed route 145 is shown by the dotted line 411. The current location of Beth on the map 409 is shown by the label C with the text "Beth". The current location of Liz on the map 409 is shown by the label B with the text "You" because Liz is the user associated with the user interface 400.

Figure 5:
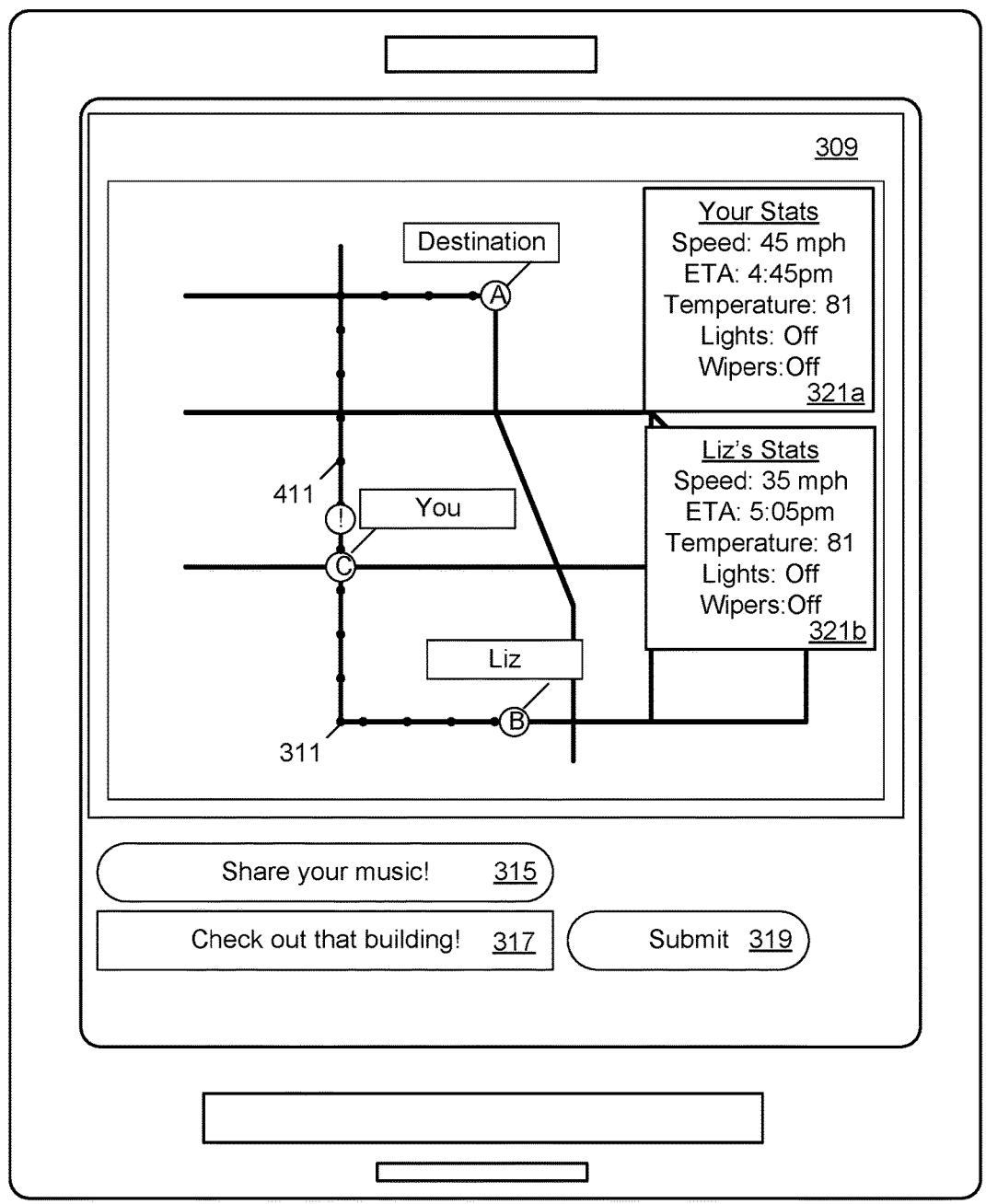

Continuing to the FIG. 5, after Liz accepts the request 120 the shared travel experience may begin. The user interface 300 of Beth has been updated to include a map 309. The map 309 shows the destination location at the label A, the location of the follower Liz at the label B, and the location of the leader Beth at the label C. The map further shows the route 145 currently being followed by the leader Beth as the dotted line 411, and the route 145 being followed by the follower Liz as the dotted line 311. As can be seen, eventually the route 145 followed by the follower Liz converges with the route 145 followed by the leader Beth.

Also shown in the user interface 300 is a user interface element 315 labeled "Share your Music!" that may allow Beth to synchronize the music that Liz is listening to with the music that Beth is listening to such that both users are listing to the same music.

Also shown in the user interface 300 is a text box 317 that Beth can use to provide a description for a point of interest 190. In the example shown, Beth has provided the text "Check out that building!", and may have indicated the point of interest 190 by touching or otherwise selecting a location on the map 309. The corresponding location is shown on the map 309 as the label "!". After entering the text for the point of interest 190, Beth can provide an indication of the point of interest 190 to Liz by selecting or pressing a user interface element 319 labeled "Submit."

Also shown in the user interface 300 are windows 321 that show various status information. As described above, the experience engine 215 may facilitate the exchange of sensor data 170 among the participants in the shared travel experience. The window 321a with the text "Your Stats" includes data collected from sensors associated with the client device 110 and/or the vehicle of Beth such as "Speed", an estimate of a time when Beth with arrive at the destination location or "ETA", the "Temperature", the status of the headlights or "Lights", and the status of the wipers or "Wipers." The window 321b with the text "Liz's Stats" shows similar status information for Liz.

Figure 6:
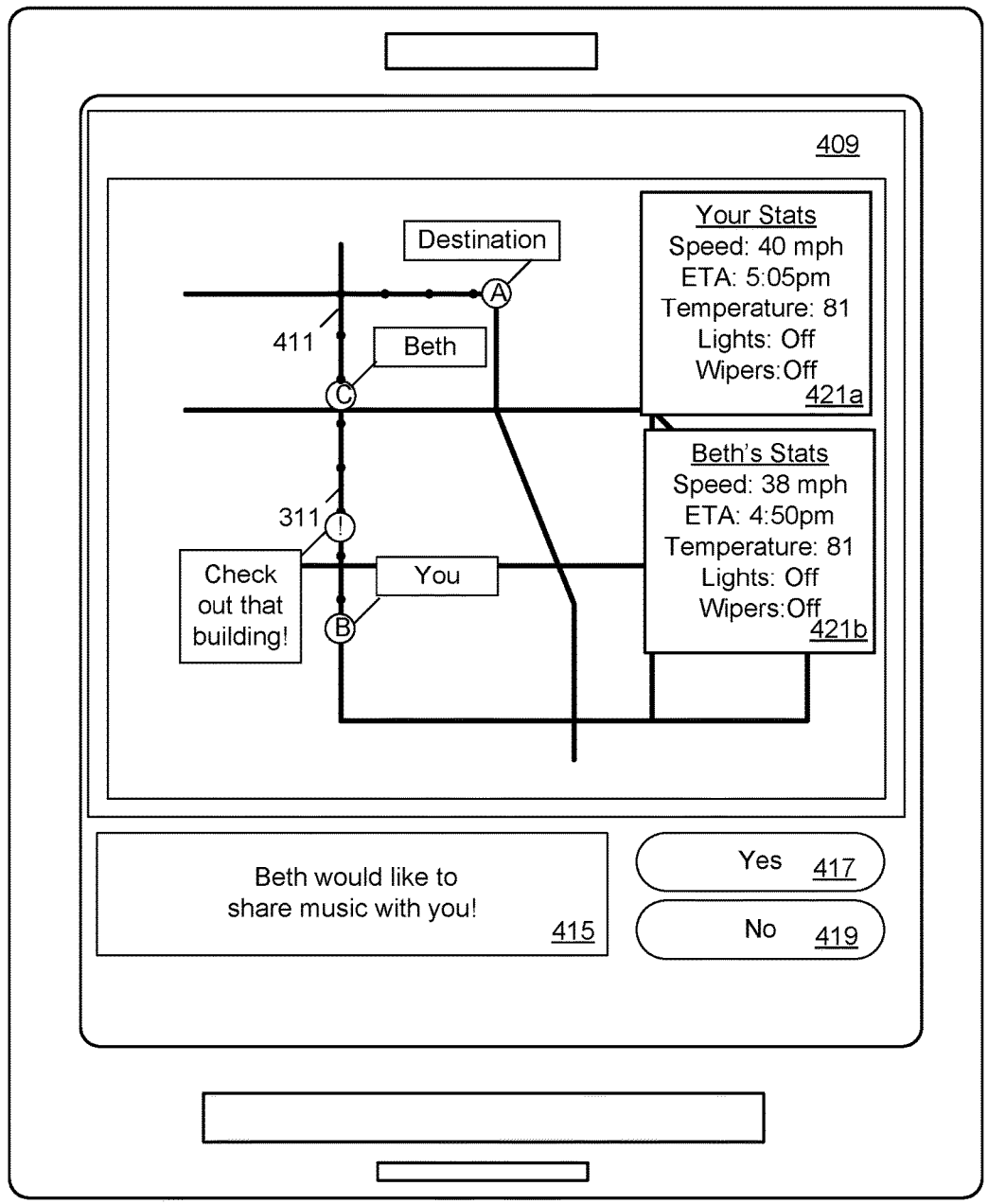

Continuing to FIG. 6, the user interface 400 associated with Liz has been updated to show the current location of Beth corresponding to the label C, as well as the current location of Liz corresponding to the label B. In addition, the user interface 400 also shows the label "!" corresponding to the point of interest 190 that Beth indicated at FIG. 5. The point of interest 190 is displayed to Liz on the map 409 along with the text "Check out that building!" provided by Beth using the text box 317.

Because Beth selected the user interface element 315, the user interface 400 also shows a text box 415 with the text "Beth would like to share music with you!". Liz may accept the shared music by touching or selecting a user interface element 417 labeled "Yes", and may reject the shared music by touching or selecting a user interface element 419 labeled "No." If Liz selects the user interface element 417, the experience engine 215 may facilitate the synchronizing of music currently playing on the client device 110 or vehicle associated with Beth with the client device 110 or vehicle associated with Liz.

Similar to the user interface 300, also shown in the user interface 400 are windows 421 that show various status information. The window 421a with the text "Your Stats" shows status information for Liz. The window 421b with the text "Beth's Stats" shows similar status information for Beth.

Figure 7:
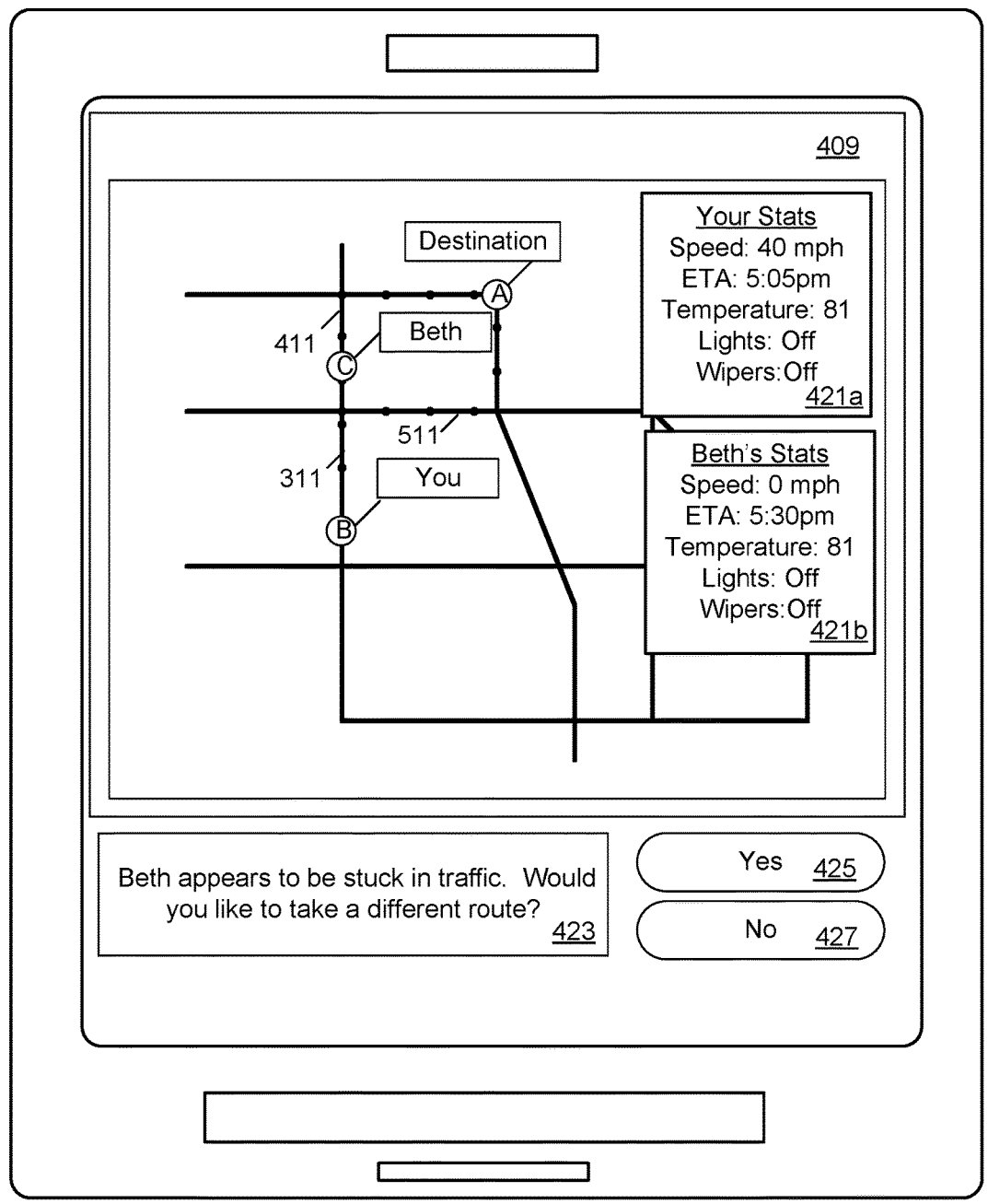

Continuing to FIG. 7, the leader Beth may have become stuck in traffic on the route 145 illustrated as the dotted line 411. As shown, in the window 421b the current speed of Beth is listed as "0" which may indicate that Beth has become stuck in traffic. Accordingly, rather than continue to instruct Liz to continue to follow her current route 145 (which converges with Liz's route 145) the map engine 210 of the trip engine 165 has calculated a new route 145 for Liz to take from her location at label B to the destination location at label A. The new route 145 is illustrated using the dotted line 511. The user interface 400 also displays a text box 423 that includes the text "Beth appears to be stuck in traffic. Would you like to take a different route?". Liz may accept the new route 145 by selecting or touching a user interface element 425 labeled "Yes", or may reject the new route 145 by selecting or touching a user interface element labeled "No".

Figure 8:
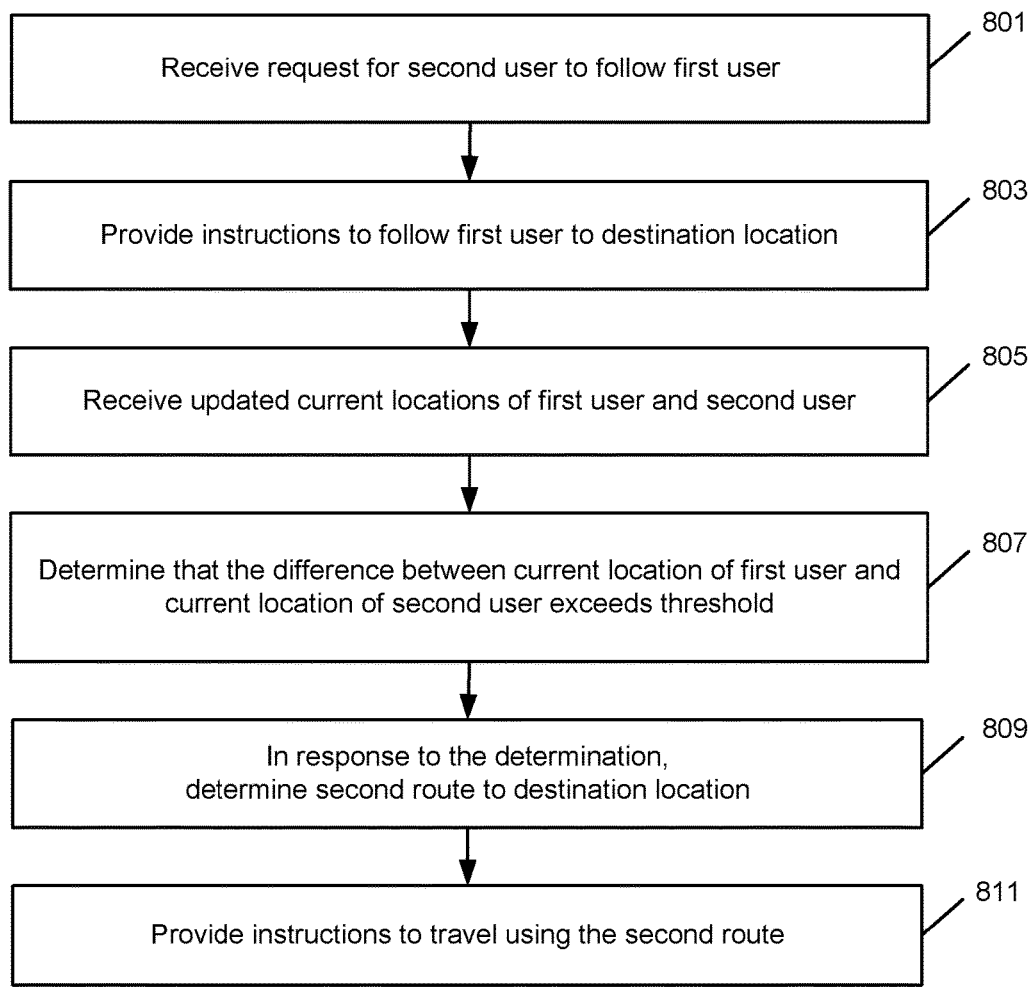
FIG. 8 is an operational flow of an implementation of a method for instructing a second user to follow a first user.

FIG. 8 is an operational flow of an implementation of a method 800 for instructing a second user to follow a first user. The method 800 may be implemented by the trip engine 165 or the trip client 113.

At 801, a request for a second user to follow a first user is received. The request 120 may be received by the initialization engine 205 of the trip engine 165 from a client device 110 associated with the first user. The first user may be a leader and the request 120 may be for the second user to follow the first user on a shared travel experience. Depending on the implementation, the request 120 may include a destination location 147, and a route 145 that the first user intends to take to the destination location 147. In addition, the request 120 may include a current location 180 of the first user.

The request 120 may also identify a mode of transportation for the trip such as driving, biking, walking, etc. The first user may be associated with a first vehicle, and the client device 110 associated with the first user may be smart phone, tablet computer, or a vehicle navigation system associated with the first vehicle.

At 803, instructions to follow the first user to the destination location are provided. The instructions 140 may be provided to a client device 110 associated with the second user by the initialization engine 205 of the trip engine 165. The instructions 140 may include the destination location and the route that the first user intends to take to the destination location. Depending on the implementation, the instructions 140 may also include a time when the second user may leave for the destination location.

Similar to the first user, the second user may be associated with a second vehicle, and the client device 110 associated with the second user may be smart phone, tablet computer, or a vehicle navigation system associated with the second vehicle.

At 805, updated current locations of the first user and the second user are received. The updated current locations 180 may be received by the map engine 210 of the trip engine 165. The updated current locations 180 may be provided GPS devices or other location determination components of the client devices 110 associated with the first user and the second user, for example.

At 807, that a difference between the current location of the first user and the current location of the second user exceeds a threshold is determined. The determination that the difference exceeds the threshold 217 may be determined by the map engine 210 of the trip engine 165. Depending on the implementation, the determined difference may be a measure of the distance between the first user and the second user, or may be a measure of a time between the first user and the second user.

As described above, the second user is following the route 145 selected by the first user to the destination location 147. However, when the second user falls too far behind the first user (e.g., in time or distance), it may be desirable to select a new route 145 for the second user to follow so that the second user can "catch up" to the first user.

At 809, a second route to the destination location is determined. The second route may be determined by the map engine 210 of the trip engine 165. The second route 145 may be different than the first route 145 and may be route between the current location 180 of the second user to the destination location 147. Alternatively, the second route 145 may be a route between the current location 180 of the second user and the current location 180 of the first user, or a predicted location 180 of the first user.

At 811, instructions to travel using the second route are provided. The instructions may be provided by the map engine 210 of the trip engine 165 to the client device 110 associated with the second user.

Figure 9:
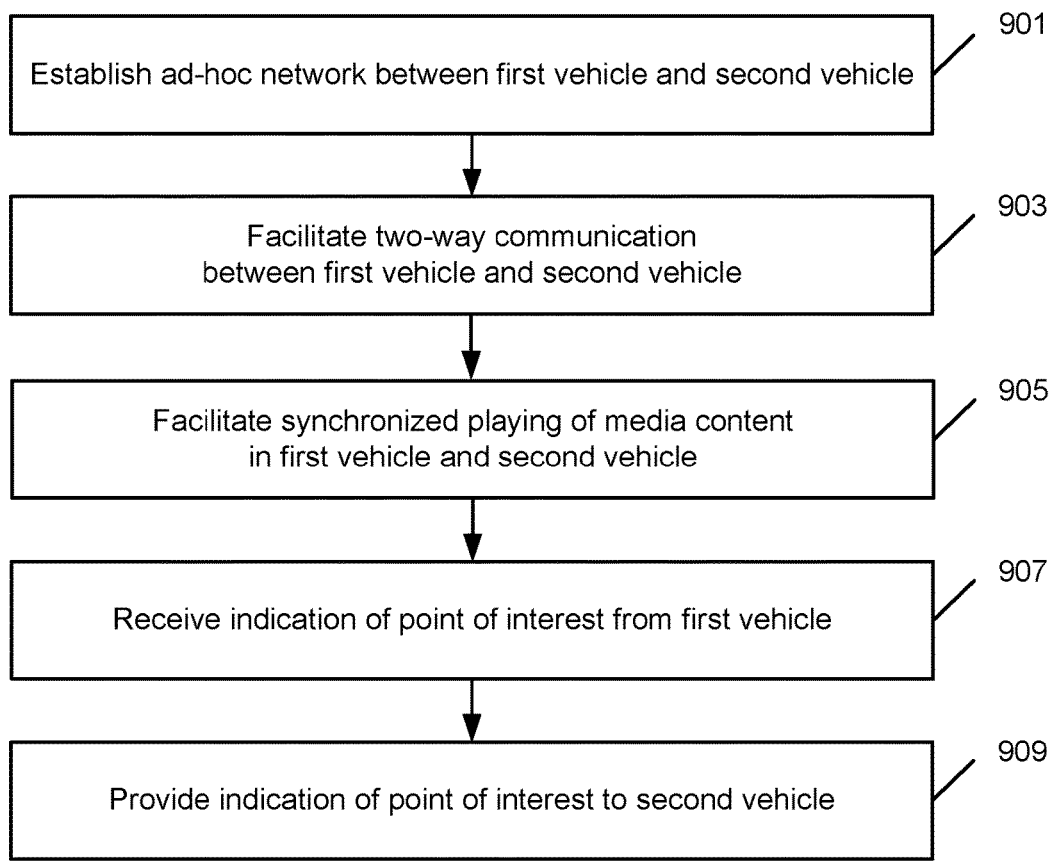
FIG. 9 is an operational flow of an implementation of a method for providing a shared travel experience using an ad-hoc network.

FIG. 9 is an operational flow of an implementation of a method 900 for providing a shared travel experience using an ad-hoc network. The method 900 may be implemented by the trip engine 165 or the trip client 113.

At 901, an ad-hoc network between a first vehicle and a second vehicle is established. The ad-hoc network 130 may be established by the experience engine 215 of the trip engine 165 using one or more networking components of client devices 110 associated with the first vehicle and the second vehicle. The client devices 110 may include vehicle navigation systems, smart phones, tablets, or other computing devices associated with one or more occupants of the first and second vehicles. The vehicles may include cars, trains, bicycles, or any other type of vehicle.

At 903, two-way communication between the first vehicle and the second vehicle is facilitated. The two-way communication between the first vehicle and the second vehicle may be facilitated by the experience engine 215 using the ad-hoc network 130. Alternatively, or if the ad-hoc network 130 is unavailable, the two-way communication may be facilitated by the experience engine 215 using the network 122.

The experience engine 215 may facilitate the two-way communication by causing the client device 110 associated with the first vehicle to record the speech of the one or more occupants of the first vehicle, and to provide the recorded speech to the client device 110 associated with the second vehicle as the communication data 150. The recorded speech may be extracted from the communication data 150, and played back for the occupants of the second vehicle by the client device 110 associated with the second vehicle. Recorded speech from the second vehicle may similarly be provided to the client device 110 associated with the first vehicle.

Depending on the implementation, the communication data 150 may be continuously provided between the first vehicle and the second vehicle using the ad hoc network 130 to provide the illusion that the occupants of the first vehicle and the second vehicle are riding together in a single vehicle. Alternatively, the communication data 150 may only be provided in response to an occupant pressing a button or selecting a user interface element.

At 905, synchronized playing of media content between the first vehicle and the second vehicle is facilitated. The synchronized playing of media content between the first vehicle and the second vehicle may be facilitated by the experience engine 215 using the ad-hoc network 130. Alternatively, or if the ad-hoc network 130 is unavailable, the synchronized playing of media content may be facilitated by the experience engine 215 using the network 122.

The experience engine 215 may facilitate the synchronized playing of media content by causing the client device 110 associated with the first vehicle to play the same media content as the client device 110 associated with the second vehicle at approximately the same time. Depending on the implementation, the experience engine 215 may cause the computing device 110 associated with the first vehicle to send media data 160 that indicates the media content that is being used in the first vehicle and some offset that indicates a current position in the media content. The media content may be audio content (e.g., a song) or may be video content (e.g., a movie). The media data 160 may further indicate a radio station or channel that is being viewed or listed to in the first vehicle. Similar to the two-way communication, by synchronizing the media content listened to, or viewed, in the first and second vehicles, the illusion that the occupants of the first vehicle and the second vehicle are riding together in a single vehicle is increased.

At 907, an indication of a point of interest is received. The indication of a point of interest 190 may be received by the experience engine 215 of the trip engine 165 from the computing device 110 associated with the first vehicle. The point of interest 190 may be indicated by an occupant of the first vehicle, and may correspond to an object, place, or thing. The point of interest 190 may have an associated location and may be associated with text or other descriptive information that describes the point of interest 190.

For example, an occupant of the first vehicle may touch a location on a map displayed on the computing device 110 that corresponds to a location of the point of interest 190. The computing device 110 may them prompt the occupant to enter, or speak, descriptive information that describes the point of interest 190. The indication of the point of interest 190, and descriptive information, may be provided by the computing device 110 of the first vehicle to the computing device 110 of the second vehicle.

At 909, the indication of the point of interest is provided. The indication of the point of interest 190 may be provided by the experience engine 215 of the trip engine 165 to the computing device 110 associated with the second vehicle. The indicated point of interest 190 may then be displayed on the computing device 110 associated with the second vehicle when the second vehicle is near or approaching the location associated with the point of interest 190.

Figure 10:
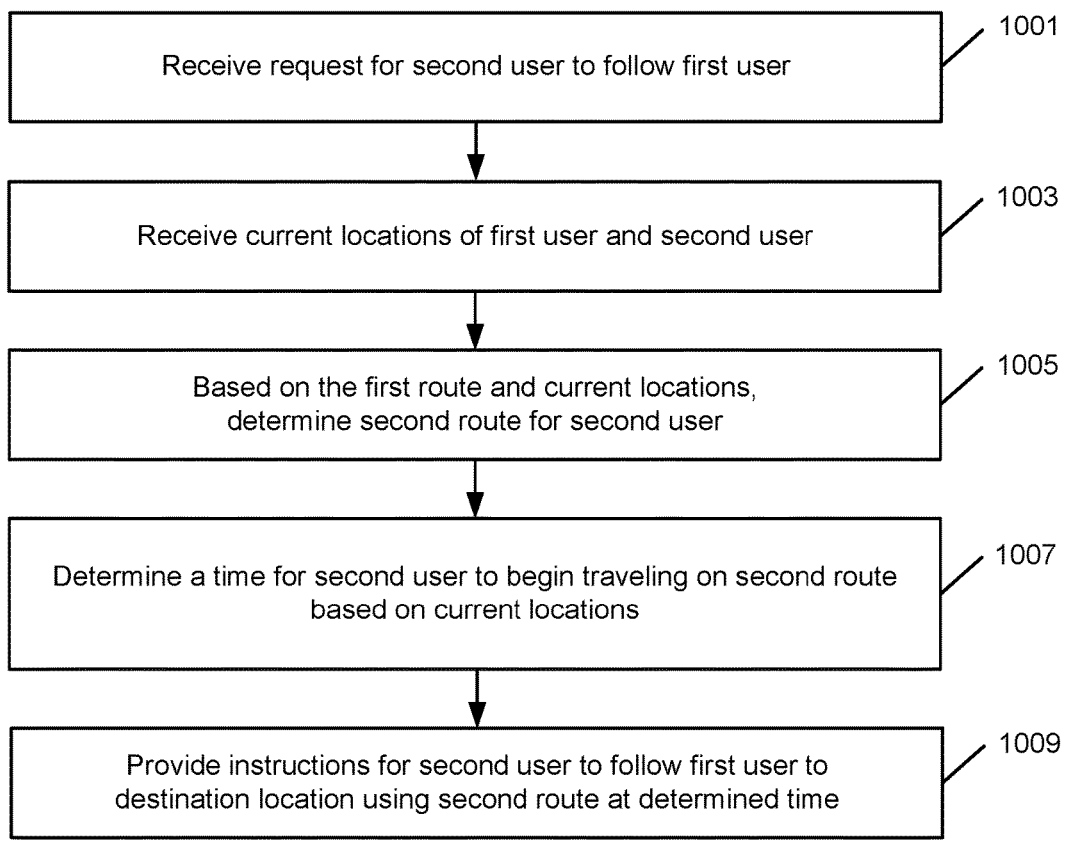
FIG. 10 is an operational flow of an implementation of a method for instructing a second user to follow a first user.

FIG. 10 is an operational flow of an implementation of a method 1000 for instructing a second user to follow a first user. The method 1000 may be implemented by the trip engine 165 or the trip client 113.

At 1001, a request for a second user to follow a first user is received. The request 120 may be received by the initialization engine 205 of the trip engine 165 from a client device 110 associated with the first user. The first user may be a leader and the request 120 may be for the second user to follow the first user on a shared travel experience. Depending on the implementation, the request 120 may include a destination location 147, and a route 145 that the first user intends to take to the destination location 147. In addition, the request 120 may include a current location 180 of the first user and may indicate a mode of transportation that may be used for the trip.

At 1003, current locations of the first user and the second user are received. The current locations may be received by the map engine 210 of the trip engine 165 from the client devices 110 associated with the first and second users.

At 1005, based on the first route and the current locations of the first user and the second user, a second route for the second user is determined. The second route 145 may be determined by the map engine 210 of the trip engine 165 using the map data 270. The second route 145 may be different from the first route 145, but may eventually converge with the first route 145 towards the destination location 147. The second route 145 may be determined so that the second user can intercept, or meet up with, the first user and travel with the user towards the destination location 147.

For example, the first user and the second user may work at the same location, and the first route 145 may be the commute to work from the house of the first user. The second user may desire to travel at least part of the commute with the first user, but because of where the second user lives, it may not make sense for the second user to commute using the first route 145. Accordingly, the second user may commute using a second route 145 that converges with the first route 145 at some location that is determined based on the location of the second user.

At 1007, a time for the second user to begin traveling on the second route is determined. The time may be determined by the map engine 210 of the trip engine 165 based on the current locations of the first and second users. The time may be determined such that if the second user begins traveling the second route 145 at the determined time, the second user may meet up with the first user on the way to the destination location 147. Because the first route 145 and the second route 145 are different, it may not be necessary for the first user and the second user to start their respective routes 145 at the same times. Continuing the example above, the first user may live farther from work than the second user.

At 1009, instructions are provided to the second user to follow the first user to the destination location using the second route. The instructions 140 may be provided by the map engine 210 of the trip engine 165 at the determined time.

FIG. 11 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of computer readable media. Computer readable media can be any available media that can be accessed by the device 1100 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may contain communication connection(s) 1112 that allow the device to communicate with other devices. Computing device 1100 may also have input device(s) 1114 such as a keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for creating a shared travel experience for a first user and a second user is provided. The system includes at least one computing device and a trip engine. The trip engine may be adapted to: receive a request for the second user to follow the first user, wherein the request comprises a first route associated with the first user and a current location of the first user, and wherein the first route comprises a destination location; provide instructions for the second user to follow the first user to the destination location using the first route; receive an updated current location of the first user; determine that a difference between a current location of the second user and the updated current location of the first user exceeds a threshold; in response to the determination, determine a second route to the destination location from the current location of the second user; and provide instructions for the second user to travel to the destination location using the second route.

Implementations may include some or all of the following features. The at least one computing device may include one or more of a smart phone or a vehicle navigation system. The first user may be associated with a first vehicle and the second user is associated with a second vehicle. The trip engine may be further adapted to establish an ad hoc network between the first vehicle and the second vehicle. The trip engine may be further adapted to facilitate two-way voice communication between the first vehicle and the second vehicle. The trip engine may be further adapted to facilitate the synchronized playing of media content in the first vehicle and the second vehicle. The trip engine may be further adapted to: determine a time for the second user to begin traveling on the first route based on the current location of the first user and the current location of the second user; and provide the instructions for the second user to follow the first user to the destination location using the first route at the determined time. The trip engine may be further adapted to: receive an indication of a point of interest from the first user; and provide the indication of the point of interest to the second user. The trip engine may be further adapted to: provide the current location of the first user to the second user; and provide the instructions for the second user to follow the first user to the destination location using the first route at a time to be determined by the second user based on the current location of the first user.

In an implementation, system for creating a shared travel experience for a first vehicle and a second vehicle is provided. The system may include at least one computing device and a trip engine. The trip engine may be adapted to: receive a request for the second vehicle to follow the first vehicle, wherein the request comprises a first route associated with the first vehicle and a current location of the first vehicle, and wherein the first route comprises a destination location; provide instructions for the second vehicle to follow the first vehicle to the destination location using the first route; establish an ad-hoc network between the first vehicle and the second vehicle; facilitate two-way voice communication between the first vehicle and the second vehicle via the ad hoc network; and facilitate the synchronized playing of media content in the first vehicle and the second vehicle via the ad hoc network.

Implementations may include some or all of the following features. The trip engine may be further adapted to: determine a time for the second vehicle to begin traveling on the first route based on the current location of the first vehicle and a current location of the second vehicle; and provide the instructions for the second vehicle to follow the first vehicle to the destination location using the first route at the determined time. The trip engine may be further adapted to: receive an indication of a point of interest from the first vehicle; and provide the indication of the point of interest to the second vehicle. The first vehicle may be one of a car, a truck, a boat, or a bicycle. The trip engine may be further adapted to: receive an updated current location of the first vehicle; determine that a difference between a current location of the second vehicle and the updated location of the first vehicle exceeds a threshold; in response to the determination, determine a second route to the destination location from the current location of the second vehicle; and provide instructions for the second vehicle to travel to the destination location using the second route. The media content may include one or more of music or video.

In an implementation, a method for creating a shared travel experience for a first user and a second user is provided. The method includes: receiving a request for the second user to follow the first user by a computing device, wherein the request comprises a first route associated with the first user, and wherein the first route comprises a destination location; receiving a current location of the first user and a current location of the second user by the computing device; based on the first route and the current locations, determining a second route for the second user by the computing device, wherein the second route comprises the destination location and is different than the first route; based on the current locations, the first route, and the second route, determining a time for the second user to begin traveling on the second route by the computing device; and providing instructions for the second user to follow the first user to the destination location using the second route at the determined time by the computing device.

Implementations may include some or all of the following features. The first user may be associated with a first vehicle and the second user may be associated with a second vehicle. The method may further include establishing an ad hoc network between the first vehicle and the second vehicle. The method may further include receiving an indication of a point of interest from the first user; and providing the indication of the point of interest to the second user. The computing device may include one or more of a smart phone or a vehicle navigation system.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system for creating a shared travel experience for a first user and a second user, the system comprising:
   at least one computing device; and
   a trip engine comprising a navigation device configured to:

receive a request for the second user to follow the first user, wherein the request comprises a first route associated with the first user and a current location of the first user, and wherein the first route comprises a destination location;

provide instructions for the second user to follow the first user to the destination location using the first route;

receive an updated current location of the first user;

determine that a difference between a current location of the second user and the updated current location of the first user exceeds a threshold, wherein the threshold is one of a distance between the current location of the user and the updated current location of the first user or is a travel time between the current location of the user and the updated current location of the first user;

in response to the determination, determine a second route to the destination location from the current location of the second user; and display, on a user interface of the computing device, instructions for the second user to travel to the destination location using the second route.

2. The system of claim 1, wherein the at least one computing device comprises one or more of a smart phone or a vehicle navigation system.

3. The system of claim 1, wherein the first user is associated with a first vehicle and the second user is associated with a second vehicle.

4. The system of claim 3, wherein the trip engine is further adapted to establish an ad hoc network between the first vehicle and the second vehicle.

5. The system of claim 3, wherein the trip engine is further adapted to facilitate two-way voice communication between the first vehicle and the second vehicle.

6. The system of claim 3, wherein the trip engine is further adapted to facilitate the synchronized playing of media content in the first vehicle and the second vehicle.

7. The system of claim 1, wherein the trip engine is further adapted to:

determine a time for the second user to begin traveling on the first route based on the current location of the first user and the current location of the second user; and provide the instructions for the second user to follow the first user to the destination location using the first route at the determined time.

8. The system of claim 1, wherein the trip engine is further adapted to:

receive an indication of a point of interest from the first user; and provide the indication of the point of interest to the second user.

9. The system of claim 1, wherein the trip engine is further adapted to:

provide the current location of the first user to the second user; and provide the instructions for the second user to follow the first user to the destination location using the first route at a time to be determined by the second user based on the current location of the first user.

10. A system for creating a shared travel experience for a first vehicle and a second vehicle, the system comprising:

at least one computing device; and a trip engine comprising a navigation device configured to:

receive a request for the second vehicle to follow the first vehicle, wherein the request comprises a first route associated with the first vehicle, and wherein the first route comprises a destination location;

provide instructions for the second vehicle to follow the first vehicle to the destination location using the first route;

establish an ad-hoc network between the first vehicle and the second vehicle;

facilitate two-way voice communication between a first user of a first client device in the first vehicle and a second user of a second client device in the second vehicle via the ad hoc network when the first client device and the second client device are within range of each other; and facilitate the synchronized playing of media content in the first vehicle and the second vehicle via the ad hoc network using an output device of the first client device and an output device of the second client device.

11. The system of claim 10, wherein the request further comprises a current location of the first vehicle, and wherein the trip engine is further adapted to:

determine a time for the second vehicle to begin traveling on the first route based on the current location of the first vehicle and a current location of the second vehicle; and provide the instructions for the second vehicle to follow the first vehicle to the destination location using the first route at the determined time.

12. The system of claim 10, wherein the trip engine is further adapted to:

receive an indication of a point of interest from the first vehicle; and provide the indication of the point of interest to the second vehicle.

13. The system of claim 10, wherein the first vehicle is one of a car, a truck, a boat, or a bicycle.

14. The system of claim 10, wherein the trip engine is further adapted to:

receive a current location of the first vehicle;

determine that a difference between a current location of the second vehicle and the current location of the first vehicle exceeds a threshold;

in response to the determination, determine a second route to the destination location from the current location of the second vehicle; and provide instructions for the second vehicle to travel to the destination location using the second route.

15. The system of claim 10, wherein the media content comprises one or more of music or video.

16. A method for creating a shared travel experience for a first user and a second user, the method comprising:

receiving a request for the second user to follow the first user by a vehicle navigation device, wherein the request comprises a first route associated with the first user, and wherein the first route comprises a destination location;

receiving a current location of the first user and a current location of the second user by the vehicle navigation device;

based on the first route and the current locations, determining a second route for the second user by the vehicle navigation device, wherein the second route comprises the destination location and is different than the first route;

based on the current locations, the first route, and the second route, determining a time for the second user to begin traveling on the second route by the vehicle navigation device;

providing instructions for the second user to follow the first user to the destination location using the second route at the determined time by the vehicle navigation device;

determining that a difference between an updated location of the second user and an updated location of the first user exceeds a threshold, wherein the threshold is one of a distance between the updated location of the second user and the updated location of the first user or is a travel time between the updated location of the second user and the updated location of the first user; and displaying, on a user interface of the vehicle navigation device, instructions for the second user to travel to the destination location using an updated route.

17. The method of claim 16, wherein the first user is associated with a first vehicle and the second user is associated with a second vehicle.

18. The method of claim 17, further comprising establishing an ad hoc network between the first vehicle and the second vehicle.

19. The method of claim 16, further comprising:
receiving an indication of a point of interest from the first user; and
providing the indication of the point of interest to the second user.

20. The method of claim 16, wherein the vehicle navigation device comprises a smart phone.

* * * * *